United States Patent [19]

Periou

[11] Patent Number: 4,940,926
[45] Date of Patent: Jul. 10, 1990

[54] INSTRUCTION GENERATOR FOR CONTROLLING THE POSITION OF AN ELEMENT, IN PARTICULAR A SLIDING OPENING ELEMENT OF AN AUTOMOBILE VEHICLE

[75] Inventor: Pierre Periou, Cergy Pontoise, France

[73] Assignee: Rockwell-CIM, France

[21] Appl. No.: 282,667

[22] Filed: Dec. 12, 1988

[30] Foreign Application Priority Data

Dec. 17, 1987 [FR] France .............................. 87 17648

[51] Int. Cl.$^5$ ........................... G05B 1/06; G05B 19/37
[52] U.S. Cl. ...................................... 318/603; 318/665; 318/671
[58] Field of Search ............... 318/265, 266, 286, 466, 318/467, 468, 470, 603, 653, 663, 665, 671

[56] References Cited

U.S. PATENT DOCUMENTS

| | | | |
|---|---|---|---|
| 2,938,154 | 5/1960 | Kirschbaum | 318/663 |
| 3,165,680 | 1/1965 | Morrison | 318/603 X |
| 3,254,283 | 5/1966 | Hunt | 318/665 X |
| 3,373,623 | 3/1968 | Gutting | 318/466 X |
| 3,431,474 | 3/1969 | Van Ostrand | 318/665 X |
| 3,754,179 | 8/1973 | Waitkoss et al. | 318/665 |
| 4,117,386 | 9/1978 | Cohen et al. | 318/665 X |
| 4,528,682 | 7/1985 | Nakaoki | 318/603 X |

Primary Examiner—Bentsu Ro

[57] ABSTRACT

The generator comprises means (2) for adjusting and an associated calculator, the adjusting means (2) comprising an endless rotative knob (4) capable of rotating through a given angle of which the position of the element to be controlled is a direct function, and pulse generating means (15, 17) generating a number of pulses which is proportional to the angle of rotation of the knob (4) and means for counting said number, and a selector of the direction of rotation. The calculator is programmed to determine, from the number of pulses counted, a proportion of the path the movable element must travel through realtive to end-of-travel means. The instruction determined by the calculator is then transmitted to a motor driving the movable element and to a position copying device. The invention permits obtaining a fine continuous, or substantially continuous, adjustment by a simple rotation of the knob. Application in particular to the control of opening elements of automobile vehicles.

6 Claims, 4 Drawing Sheets

INSTRUCTION GENERATOR FOR CONTROLLING THE POSITION OF AN ELEMENT, IN PARTICULAR A SLIDING OPENING ELEMENT OF AN AUTOMOBILE VEHICLE

The present invention relates to an instruction generator for controlling the position of an element, in particular a sliding opening element of an automobile vehicle, and to a control device comprising said generator and a closed loop position control.

It is known that sliding opening elements of vehicles (window glasses, opening roofs) are often controlled by actuators comprising an electric motor. Most often, this motor is controlled in an on-off manner by means of a switch provided for the user. Now, it has been found to be difficult to finely adjust the position of the opening element, especially in the vicinity of the complete closure, owing to the relatively high operating speed.

Various devices have therefore been proposed to solve this problem, but no device permits obtaining a sufficient precisioin or a continuous adjustment.

According to the invention, the instruction generator comprises an endless adjusting means and an associated calculator provided with means for determining a proportion of the path to be travelled through by the element as a function of an instruction given to the adjusting means relative to end-of-travel means for said element.

This instruction generator, which is advantageously completed by a closed loop position control or continuous or substantially continuous position copying control, permits obtaining a "magnifying" effect allowing a fine adjustment in a continuous or substantially continuous manner, with precision of adjustment of the position copying device apart from a very small error.

According to an embodiment of the invention, the adjusting means comprises an endless rotative control knob capable of turning through a given angle of which the position of the element is a direct function, and pulse generating means whose number of pulses is proportional to the angle of rotation of the knob and means for counting said number, and a selector of the direction of rotation, the calculator being programmed to produce the instruction from the number of pulses received by calculating the ratio between said given angle and a maximum angle available to a user from the position of the element to be controlled and from the direction of controlled displacement.

According to other features, the adjusting means comprises:

a case containing the control knob and having a opening through which a part of the knob projects outside the case in an angle corresponding to the width of the opening, a rotation of the knob through said angle being capable of achieving the maximum travel of the element;

a shaft disposed in the case on which the knob is rotatively mounted and which carries a friction member cooperative with a switch forming a selector of the direction of rotation of the knob.

Further features and advantages of the invention will be apparent from the following description with reference to the accompanying drawings which illustrate an embodiment of the invention by way of a non-limitative example.

Figure 7:
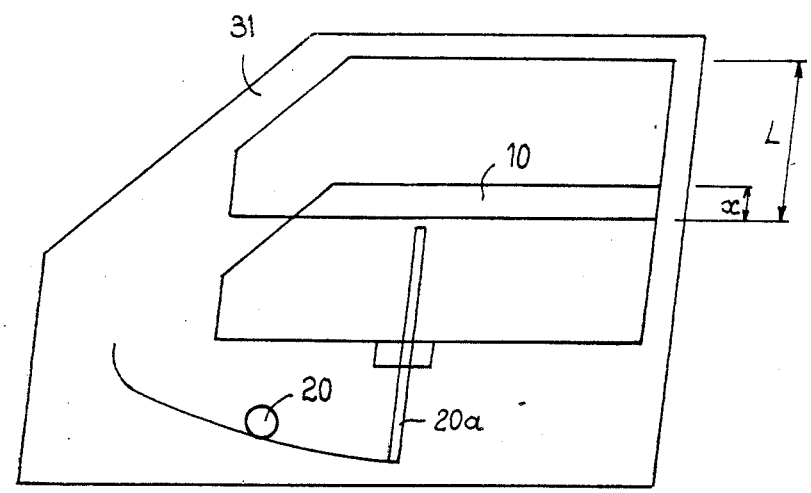
FIG. 7 is a diagrammatic elevational view of a window raiser of a vehicle door to which the instruction generator may be applied.

The instruction generator illustrated in the drawings is adapted to control the position of an element (not shown) such as, for example, but not exclusively, a sliding opening element of an automobile vehicle (window glass 10 of a door 31 as illustrated in FIG. 7).

This generator 1 comprises an endless adjusting means and an associated calculator or computer 3 provided with means for determining a proportion of the path through which the movable element is intended to travel as a function of an instruction given to the adjusting means 2, relative to end-of-travel means for said element.

The adjusting means 2 comprises an endless rotative control knob 4 having a knurled surface and a cylindrical shape, it being closed, at one end, by an end wall 5 and being open at the opposite end, so as to constitute a sort of bell structure. The knob 4 is disposed in a case 6 which has a lateral opening 7 through which a part of the knob 4 projects outside the case 6 within an angle $\alpha_M$ substantially corresponding to the width of the opening 7, the apex angle being located on the geometrical axis of rotation XX of the knob 4.

This geometrical axis is materialized by a shaft 8 journalled at both ends in bearings 9, 11 provided in a wall of the case 6 and in a cover 6a of this case.

The shaft 8 carries a friction member 12 constituted in the presently-described embodiment by an omega-shaped spring mounted in an annular groove in the shaft 8, the terminal portions 12a, 12b of this spring being spaced apart by a given angular amount. The friction member 12 surrounds the shaft 8 and is cooperative with an electric switch 13 constituting a selector of the direction of rotation of the knob 4. The switch 13 comprises two fixed contacts 13a and 13b and two moving contacts 13c and 13d, one fixed contact and one moving contact being disposed on each side of a flexible control rod 14 interposed between the terminal portions 12a, 12b of the friction member 12. The fixed contacts 13a, 13b, the movable contacts 13c, 13d and the rod 14 are mounted on the inner wall of the case 6.

The adjusting means 2 is further provided with pulse generating means generating a number of pulses which is proportional to the angle of rotation of the knob 4, and means for counting said number by means of the calculator 3. In the presently-described embodiment, these means comprise a notched ring 15 fixed to the inner wall 5 or moulded in one piece in the latter coaxially relative to the shaft 8 and having on its periphery a series of notches 16, and a photo-coupler 17 fixed inside the case 4 and positioned astride the notched ring 15. The photo-coupler 17 comprises, in the known manner, light-emitting diode (LED) and a photo-transistor. The photo-coupler 17 and the switch 13 are electrically interconnected and also connected to a calculator or computer 3 and a dc supply. The moving contacts 13c, 13d are in this way connected to the photocoupler 17 through a connection 18 transmitting pulses; the fixed contacts 13a, 13b are connected to the calculator 3 through connections 19a, 19b. The calculator 3 is also connected to the photo-coupler 17 through connections 21a, 21b. The connections 19a, 19b conduct, either one, the pulses in accordance with the direction of rotation. The connections 21a, 21b supply dc power to the photocoupler 17. The connections 19a, 19b and 21a, 21b extend through the wall of the case 6 which may be provided with lateral tabs 22 for elastically securing it to a desk element, an armrest or a control panel of a vehicle (not shown).

It should be noted that the control or adjusting knob 4 has no stop as concerns its rotation.

Figure 5:
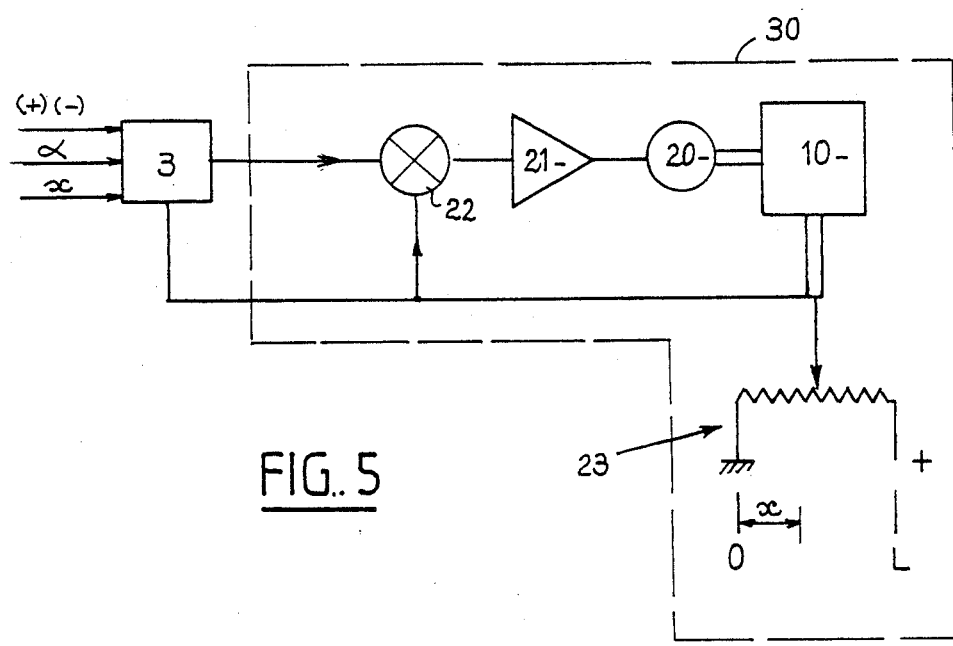
FIG. 5 is an electric diagram of a loop control system or a position copying system capable of receiving data provided for the calculator associated with the adjusting by means of the instruction generator.
Figure 6:
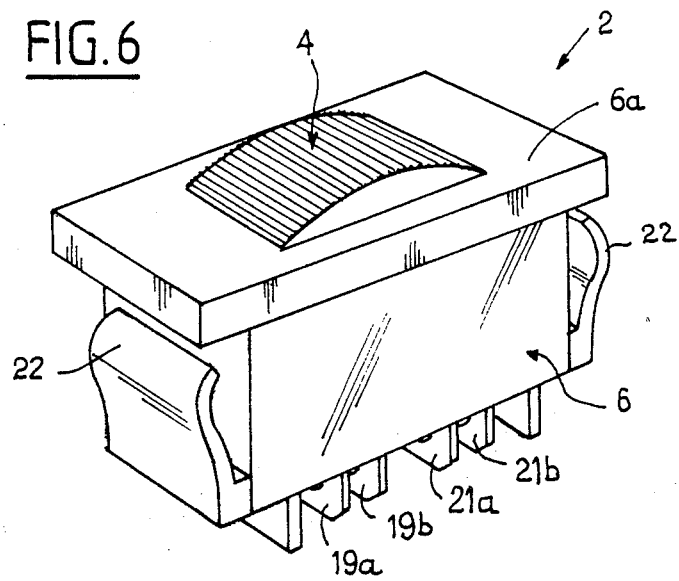
FIG. 6 is a perspective view of the adjusting means of the instruction generator according to the invention.

The calculator 3 is suitably programmed in such manner as to calculate, from the detection and the counting of the pulses generated by the passage of the notches 16 of the ring 15 in the photo-coupler 17, an instruction C for a control loop system or a sytem for copying the position 30, illustrated in FIG. 5. This position copying system comprises in the conventional manner a motor 20 for driving the movable element 10, an amplifier 21 (proportional or "ON-OFF"), a comparator 22 and a copying element 23 which delivers an item of information corresponding to the dimension x of the position of the movable element 10 between end-of-travel means 0 and L (for example the window glass 10 shifted by the motor 20 of an electric window raiser 20a shown in FIG. 7).

The device for controlling the position of a movable element just described permits an adjustment of the element in a continuous or substantially continuous manner by the position copying device of FIG. 5 and this control device operates in the following manner.

If, $\alpha_M$ is the angle available to the user allowed by the opening 7, this user turns the knurled knob 4 in either direction through an angle $\alpha$ which is less than or equal to the angle $\alpha_M$. This rotation results in the following technical effects:

(a) the passage of the notches 16 in the photo-coupler 17 generates a number of pulses which is proportional to the angle of rotation of the knob 4 and which corresponds to the number n of notches 16 which have passed between the branches of the photo-coupler 17. The maximum angle $\alpha_M$ corresponds to a number N of pulses and consequently the number n of pulses corresponding to the angle $\alpha$ is also proportional to the latter, which number is transmitted by the photo-coupler 17 to the calculator 3.

(b) the friction member 12, driven by the shaft 8, rotates at the same time as the knob 4, so that, depending on its direction of rotation, one of its terminal portions 12a, 12b actuates the rod 14 which becomes inclined and closes one of the electric contacts 13a, 13c or 13b, 13d. This closure of the switch 13 occurs at the start of the rotation of the control knob 4, the member 12 thereafter exerting a friction on the shaft 8 which continues to rotate while the member 12 remains in its angular position for closing the switch 13.

Figure 2:
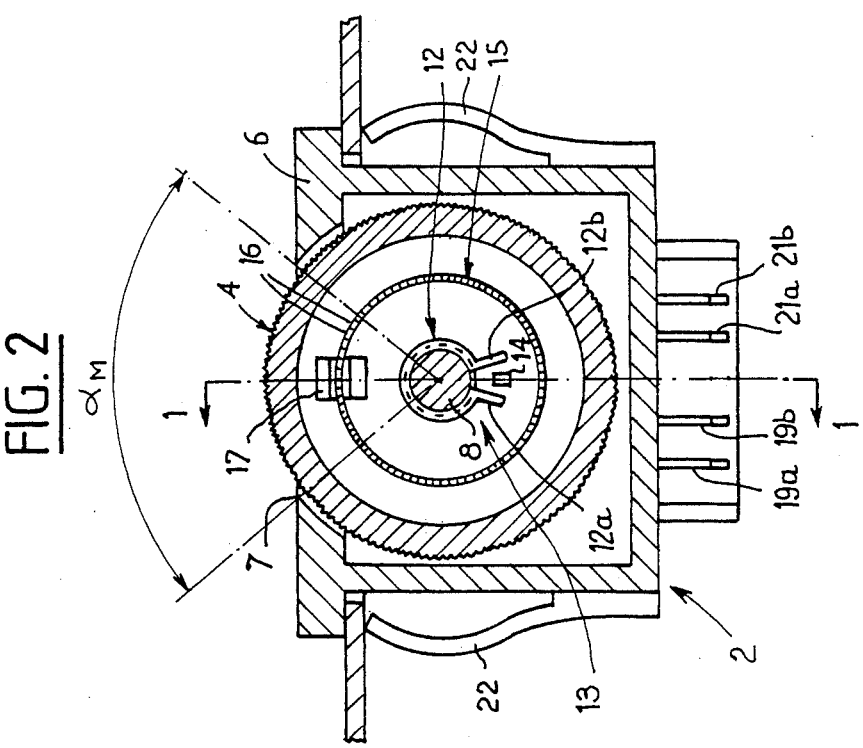
FIG. 2 is a sectional view taken on line 2—2 of FIG. 1.
Figure 1:
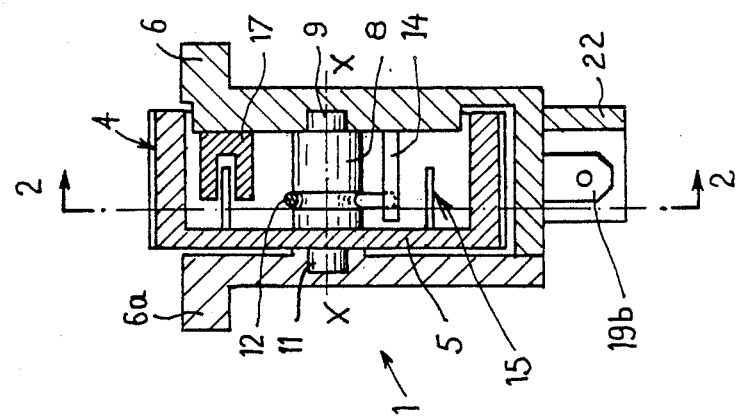
FIG. 1 is a sectional view taken on line 1—1 of FIG. 2 of an embodiment of the instruction generator according to the invention.
Figure 3:
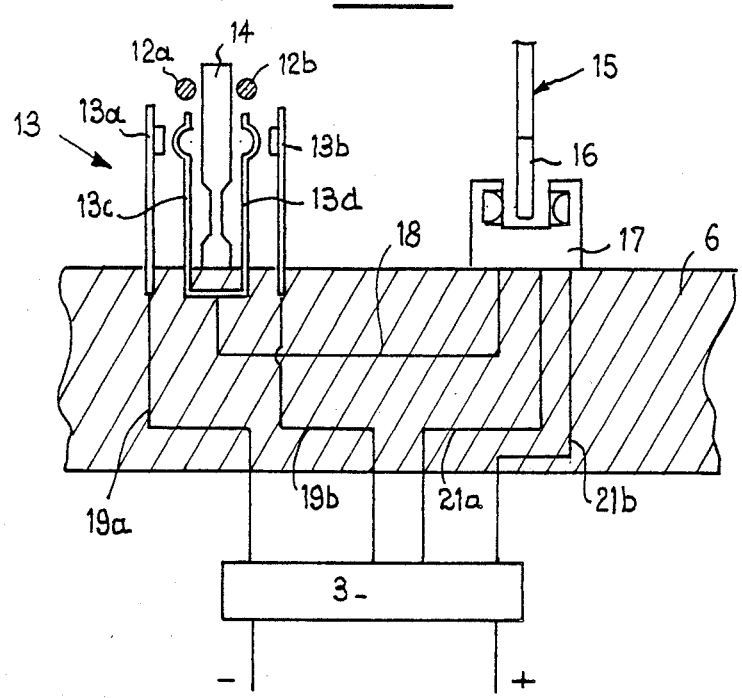
FIG. 3 is a partial enlarged elevational view of the instruction generator of FIGS. 1 and 2.
Figure 4:
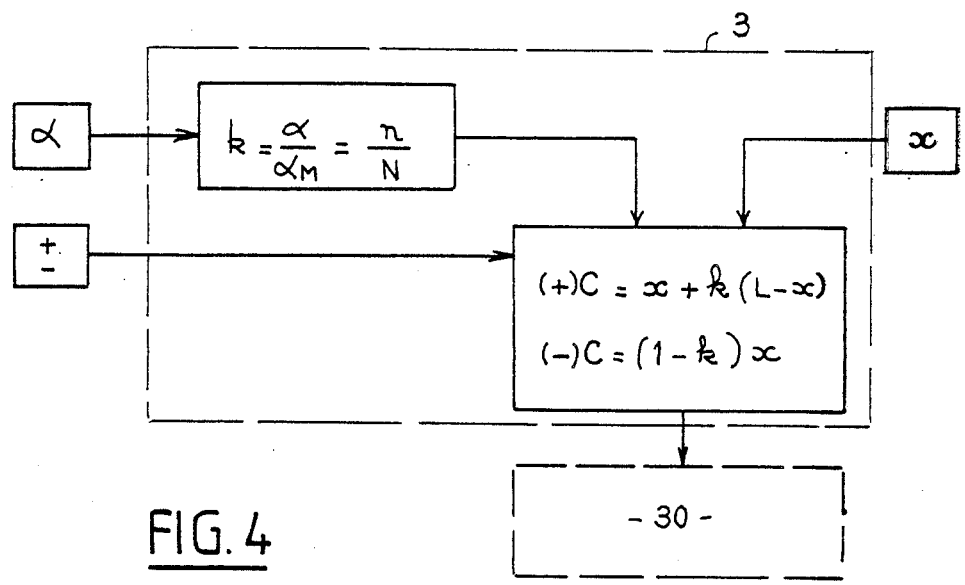
FIG. 4 is a block diagram of the algorithm of the software program of the calculator associated with the instruction generator of FIGS. 1 to 3.

The calculator or computer 3 is provided with a software program for carrying out the algorithm illustrated in FIG. 4, x being the dimension of the position of the element to be shifted by the electric motor 20, this dimension being between two extreme values O and L and being measured by the position copying device shown in FIG. 5.

Depending on whether the user wishes to increase or reduce the value x, he rotates the knob 4 in one direction or the other. The calculator 3 first of all calculates the ratio $k=\alpha/\alpha_M=n/N$. Then the program of the calculator 3 determines in the following manner the instruction C as a function of the ratio k and of the direction (plus or minus) of the controlled displacement, to which corresponds an increase or a decrease in the dimension x between the two end positions O and L:

if the initial dimension must be decreased, the instruction calculated by the program is $$C=(1-k)x$$

if the initial dimension must, on the contrary, be increased, the instruction calculated by the program is $$C=k(L-k)+x$$

The value of the instruction C thus determined is recorded, transmitted to the control loop system 30 and the motor 20 of the actuator of the movable element 10 is rotated until the position copying device 23 measures a new value of x equal to the instruction C apart from error.

Thus, the device according to the invention permits adjusting, by rotation of the knob 4, the position of the movable element in proportion to the remainder of the path to be travelled through for reaching the end-of-travel 0 or L. To achieve the complete opening or closure of the controlled movable element, the user must turn the knob 4 through the whole of the available angle $\alpha_M$ from any starting position.

On the other hand, a succession of partial rotations permits the adjustment of the position of the movable element which is as fine as the user desires, each shifting being adjusted in proportion to the remainder of the travel to be effected.

Figure 8:
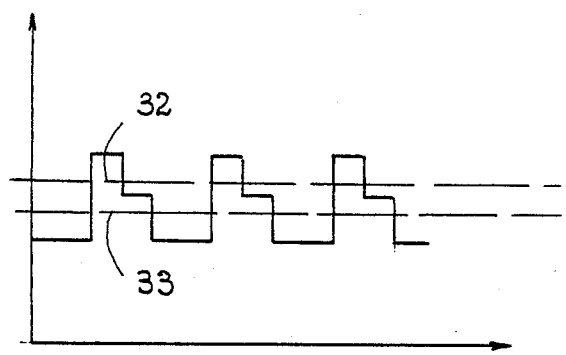
FIG. 8 is a developed diagram of a variant of the pulse generator.

The embodiment just described may be modified in various ways, in particular in the technology of the generation of pulses; the photo-coupler 17 may be replaced by electric contact systems, a Hall effect probe, in the known manner. Likewise, the selection of the direction of rotation may be achieved by a double pulse generator having two channels 32, 33 (FIG. 8) in the known manner.

I claim:

1. Instruction generator for controlling the position of an element in a path through which the element is intended to travel between end-of-travel means, said generator comprising an endless adjusting means and an associated calculator provided with means for determining a proportion of said path as a function of an instruction given to the adjusting means relative to said end-of-travel means wherein the adjusting means comprises an endless rotative control knob capable of turning through a given angle and pulse generating means generating a number of pulses proportional to the angle of rotation of the knob, and means for counting said number of pulses and means for selecting the direction of rotation, the calculator being programmed for producing the instruction of which the position of the element is a direct function, from the number of pulses received by calculating the ratio between said given angle and a maximum angle available to a user, from the position of the element to be controlled and from the direction of the controlled displacement of the element.

2. Generator according to claim 1, wherein the adjusting means comprises:
- a case containing the control knob and defining an opening through which a part of the knob projects outside the case in an angle corresponding to the width of the opening, the rotation of the knob through said angle corresponding to the width of the opening being capable of achieving the whole of the travel of the element from any starting position;
- a shaft disposed in the case and on which shaft the knob is rotatively mounted and on which shaft is placed a member which is capable of cooperating with a switch constituting a selector of the direction of rotation of the knob, wherein the calculator, associated with a device for detecting and counting the pulses, being programmed for determining the ratio $k=n/N$ of the number n of recorded pulses to the number N of pulses corresponding to said maximum angle available to the user, then, depending on the direction of the controlled displacement, the initial dimension x of the element positioned between two end positions O and L, the instruction C is defined as:

$$C=(1-k)x$$

if the initial dimension must be decreased, or $$C=k(L-x)+x$$

if the initial dimension must be increased,

3. Generator according to claim 1, wherein the adjusting means comprises:
- a case containing the control knob and defining an opening through which a part of the knob projects outside the case in an angle corresponding to the width of the opening, the rotation of the knob through said angle corresponding to the width of the opening being capable of achieving the whole of the travel of the element from any starting position;
- a shaft disposed in the case and on which shaft the knob is rotatively mounted and on which shaft is placed a member which is capable of cooperating with a switch constituting a selector of the direction of rotation of the knob.

4. Generator according to claim 3, wherein said member is frictionally mounted on the shaft and includes two terminal portions between which terminal portions is placed a control rod carried by the case and associated with the switch, said switch being formed by two fixed contacts and two movable contacts disposed on each side of the control rod.

5. Generator according to claim 1, wherein the knob is provided with an inner notched ring, the movement of which ring in front of a detecting and counting device creates pulses whose number is proportional to the angle of rotation of the knob and the notched ring.

6. A method for controlling the position of a movable element in a path between end-of-travel means by means of an instruction generator including a knob, pulse generating means, switching means with electrical contacts, and calculator means, comprising the steps of:
- rotating said knob for an angle to a given angle which is less than or equal to a maximum angle available;
- generating a number of pulses in said pulse generating means, which is proportional to the angle of rotation;
- closing respective electrical contacts which correspond to a selection of the direction of rotation; and
- counting said number of pulses in said calculator means and producing an instruction of which the position of the element is a direct function from the number of pulses received by said calculator means by calculating the ratio between said given angle and said maximum angle available.

* * * * *